United States Patent
Sathaye et al.

(10) Patent No.: US 11,755,374 B2
(45) Date of Patent: Sep. 12, 2023

(54) CLOUD RESOURCE AUDIT SYSTEM

(71) Applicant: Dell Products L.P., Round Rock, TX (US)

(72) Inventors: Sumedh Wasudeo Sathaye, Austin, TX (US); Nakul Shrivastava, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 321 days.

(21) Appl. No.: 15/929,860

(22) Filed: May 26, 2020

(65) Prior Publication Data
US 2021/0373950 A1 Dec. 2, 2021

(51) Int. Cl.
*G06F 9/50* (2006.01)
*G06F 8/65* (2018.01)

(52) U.S. Cl.
CPC ............... *G06F 9/505* (2013.01); *G06F 8/65* (2013.01); *G06F 9/5061* (2013.01)

(58) Field of Classification Search
CPC .................... G06F 9/505–5061; G06F 8/65
See application file for complete search history.

(56) References Cited

U.S. PATENT DOCUMENTS

| | | | | |
|---|---|---|---|---|
| 2010/0199351 A1* | 8/2010 | Protas | ................... | G06F 21/577 718/1 |
| 2010/0325727 A1* | 12/2010 | Neystadt | ................. | G06F 21/53 726/22 |
| 2012/0179646 A1* | 7/2012 | Hinton | ................... | G06F 16/25 707/607 |
| 2012/0311344 A1* | 12/2012 | Sabin | .................. | G06F 9/45533 718/1 |
| 2014/0317681 A1* | 10/2014 | Shende | ................... | H04L 63/10 726/1 |
| 2015/0332280 A1* | 11/2015 | Deshpande | .......... | G06Q 30/018 705/317 |
| 2015/0350188 A1* | 12/2015 | Gilpin | ..................... | G06F 21/53 726/9 |

(Continued)

OTHER PUBLICATIONS

CloudInspector: A Transparency-as-a-Service Solution for Legal Issues in Cloud Computing Matthias Flittner, Silvia Balaban, Roland Bless (Year: 2016).*

(Continued)

*Primary Examiner* — Emerson C Puente
*Assistant Examiner* — Paul V Mills
(74) *Attorney, Agent, or Firm* — Joseph Mencher (57) ABSTRACT

A cloud resource audit system includes a plurality of datacenter hardware resources and a cloud resource management controller that is coupled to the plurality of datacenter hardware resources and that allocates a first portion of the plurality of datacenter hardware resources to run one or more workloads for a first end user on the first portion of the plurality of datacenter hardware resources. The cloud resource management controller then executes a first set of audit instructions to performs a first audit action on one or more datacenter hardware resources included in the first portion of the plurality of datacenter hardware resources, and provides, in response to the first set of audit instructions being executed and the first audit action being performed, a first set of audit results to an audit terminal device.

20 Claims, 5 Drawing Sheets

(56) References Cited

U.S. PATENT DOCUMENTS

| | | | | |
|---|---|---|---|---|
| 2015/0350214 A1* | 12/2015 | Gilpin | ............... | H04L 63/08 |
| | | | | 726/5 |
| 2017/0192810 A1* | 7/2017 | Lukacs | ............... | G06F 9/5072 |
| 2018/0285887 A1* | 10/2018 | Maung | ............... | G06Q 10/10 |
| 2020/0233722 A1* | 7/2020 | Bihannic | ............... | H04L 67/10 |
| 2020/0234817 A1* | 7/2020 | De Armas | ............... | G16H 10/60 |
| 2021/0034496 A1* | 2/2021 | Schechter | ............... | G06F 11/3404 |

OTHER PUBLICATIONS

Trust is Good, Control is Better: Creating Secure Clouds by Continuous Auditing Sebastian Lins, Stephan Schneider, and Ali Sunyaev (Year: 2018).*

Utilizing Third Party Auditing to Manage Trust in the Cloud Syed Rizvi*, Kelsey Karpinski, Brennen Kelly, Taryn Walker (Year: 2015).*

A Case for the Accountable Cloud Andreas Haeberlen (Year: 2010).*

Automation Service for the Framework of Evidence Christoph Reich, Thomas Rübsamen Deliverable D38.3 of Cloud Accountability Project A4Cloud (Year: 2015).*

Access-Authorizing and Privacy-Preserving Auditing with Group Dynamic for Shared Cloud Data Wenting Shen, Jia Yu, Guangyang Yang, Yue Zhang, Zhangjie Fu, and Rong Hao (Year: 2016).*

Privacy Design Guidelines for Accountability Tools Melek Onen, Tobias Pulls Deliverable D:37.2 (D:C-7.2) of Cloud Accountability Project A4Cloud Sections 1, 2, 4, 6 and Appendix D (Year: 2014).*

Cloud Audits and Privacy Risks Thomas Rubsamen and Christoph Reich (Year: 2013).*

Designing Monitoring Systems for Continuous Certification of Cloud Services: Deriving Meta-requirements and Design Guidelines Sebastian Lins, Stephan Schneider, Jakub Szefer, Shafeeq Ibraheem, Ali Sunyaev (Year: 2019).*

Authorized third party auditing and integrity verification in cloud computing Dr. A Suresh, S. Pachaiappan and P. Pasupathi (Year: 2015).*

Study on the Third-party Audit in Cloud Storage Service* Ling Li Lin Xu Jing Li Changchun Zhang (Year: 2011).*

Building Accountability Middleware to Support Dependable SOA Kwei-Jay Lin, Mark Panahi, Yue Zhang, Jing Zhang, and Soo-Ho Chang (Year: 2009).*

Securing Multi-Cloud By Auditing S. Naveen, Vignesh Kumar, Dr. R. Meenakshi (Year: 2017).*

* cited by examiner

CLOUD RESOURCE AUDIT SYSTEM

BACKGROUND

The present disclosure relates generally to information handling systems, and more particularly to performing audits on information handling systems that provide cloud resources.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be configured to provide services such as, for example, Bare-Metal as a Service (BMaaS) services, Bare-Metal Cloud (BMC) services, and/or other services known in the art. For example, BMaaS services may include the provisioning of datacenter infrastructure resources as a service to users, with users renting a dedicated resource environment from a datacenter infrastructure owner that provides the BMaaS services. As such, the users may contract with the infrastructure owner to utilize server resources, storage resources, and/or networking resources from a pool of hardware resources available in the datacenter infrastructure, and any datacenter infrastructure resources included in a datacenter may be utilized to provide as a BMaaS service including, for example, Redundant Array of Independent Disks (RAID) configurations, Network Interface Controller (NIC) configurations, Basic Input/Output System (BIOS) settings, Virtual Local Area Network (VLAN) configurations, jumbo frames configurations, Logical Unit Number (LUN) configurations, and/or other datacenter infrastructure configurations that would be apparent to one of skill in the art in possession of the present disclosure. As will be appreciated by one of skill in the art, users that have performance-intensive workloads and/or that must adhere to strict privacy requirements may prefer a BMaaS service over other cloud services that provide virtual resources in a multi-tenant cloud environment. Similarly, users that must demonstrate that their workloads are operating on a non-shared environment (e.g. not shared with a competitor), may prefer a BMaaS service over other cloud services that provide virtualized resources in a multi-tenant cloud environment.

To control the datacenter infrastructure resources that are allocated to users via BMaaS services, the user may access the hardware resources in the datacenter infrastructure through a BMC controller that enables and exercises fine-grain control over all aspects of the BMaaS services, typically through out-of-band communications via an out-of-band channel with remote access controller(s) (e.g., a DELL® Remote Access Controller (iDRAC) available from DELL® Inc. of Round Rock, Tex., United States, a baseboard management controller, and/or other remote access controllers known in the art) that are included in the hardware resources. As such, with BMaaS services, the user receives the same benefits at the bare-metal level that are typically only found when purchasing virtual machines in a cloud environment (e.g., Amazon Web Services (AWS)® available from AMAZON.COM® Inc. of Seattle, Wash., United States, or Azure® services available from MICROSOFT® Corporation of Redmond, Wash., United States), which may include a capital-expenditure-to-operation-expenditure conversion, dynamic scaling, cost optimization, efficiency, and/or other benefits of conventional cloud computing that would be apparent to one of skill in the art in possession of the present disclosure.

As with cloud services, audits may be performed by a third-party auditor on the hardware resources in the datacenter infrastructures that provide the BMaaS services allocated to the users. For example, audits may be performed to identify problems (e.g., security lapses), regulatory goals, safety goals, and/or for any other auditing reason known in the art. Typically, third-party auditors have limited knowledge of the system under audit, and conventionally perform their audits by reading a state of a component included in the hardware resources in the datacenter infrastructure that is being used to provide the BMaaS services and determining whether an audit condition is satisfied when a state of the hardware resource matches an expected state. As such, audit conditions for hardware resources in the datacenter infrastructure that is being used to provide BMaaS services are only verified at a point-in-time, which leaves open the possibility that audits may be manipulated by the user and/or infrastructure owner, either of which may know what states the auditor is looking for and when the auditor is looking for those states. Furthermore, current mechanisms to perform audits provide limited audit capabilities, and do not allow for audits during "live" operation of the hardware resources in the datacenter infrastructure that is allocated to the user.

Accordingly, it would be desirable to provide an audit system that addresses the issues discussed above.

SUMMARY

According to one embodiment, an Information Handling System (IHS) includes a processing system; and a memory system coupled to the processing system and that includes instructions that, when executed by the processing system, cause the processing system to provide a cloud resource management engine that is configured to: allocate, via a network connection, a first portion of a plurality of datacenter hardware resources to run one or more workloads for a first end user on the first portion of the plurality of datacenter hardware resources; execute a first set of audit instructions to perform, via the out-of-band network connection, a first audit action on one or more datacenter hardware resources included in the first portion of the plurality of datacenter hardware resources; and provide, in response to the first set of audit instructions being executed and the first audit action being performed, a first set of audit results to an audit terminal device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
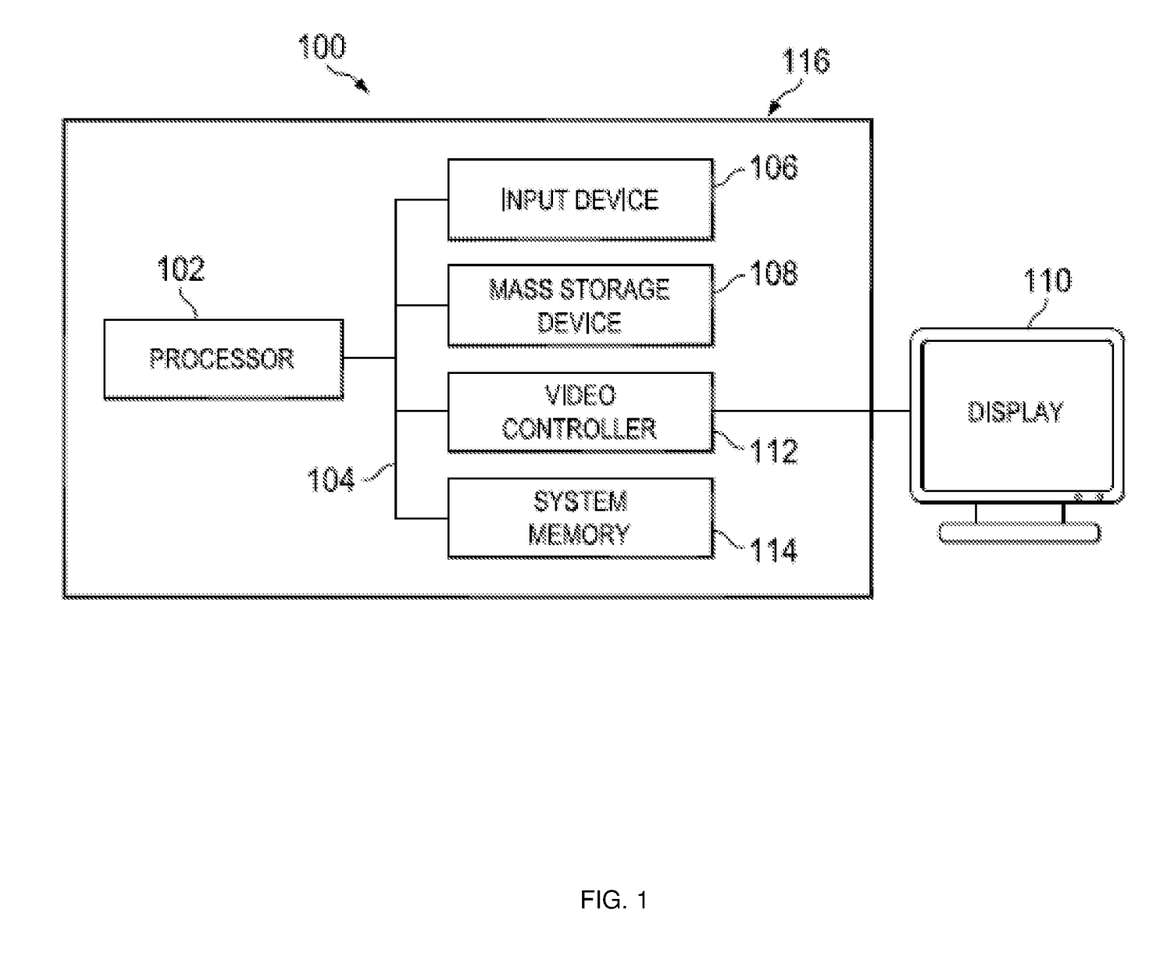
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
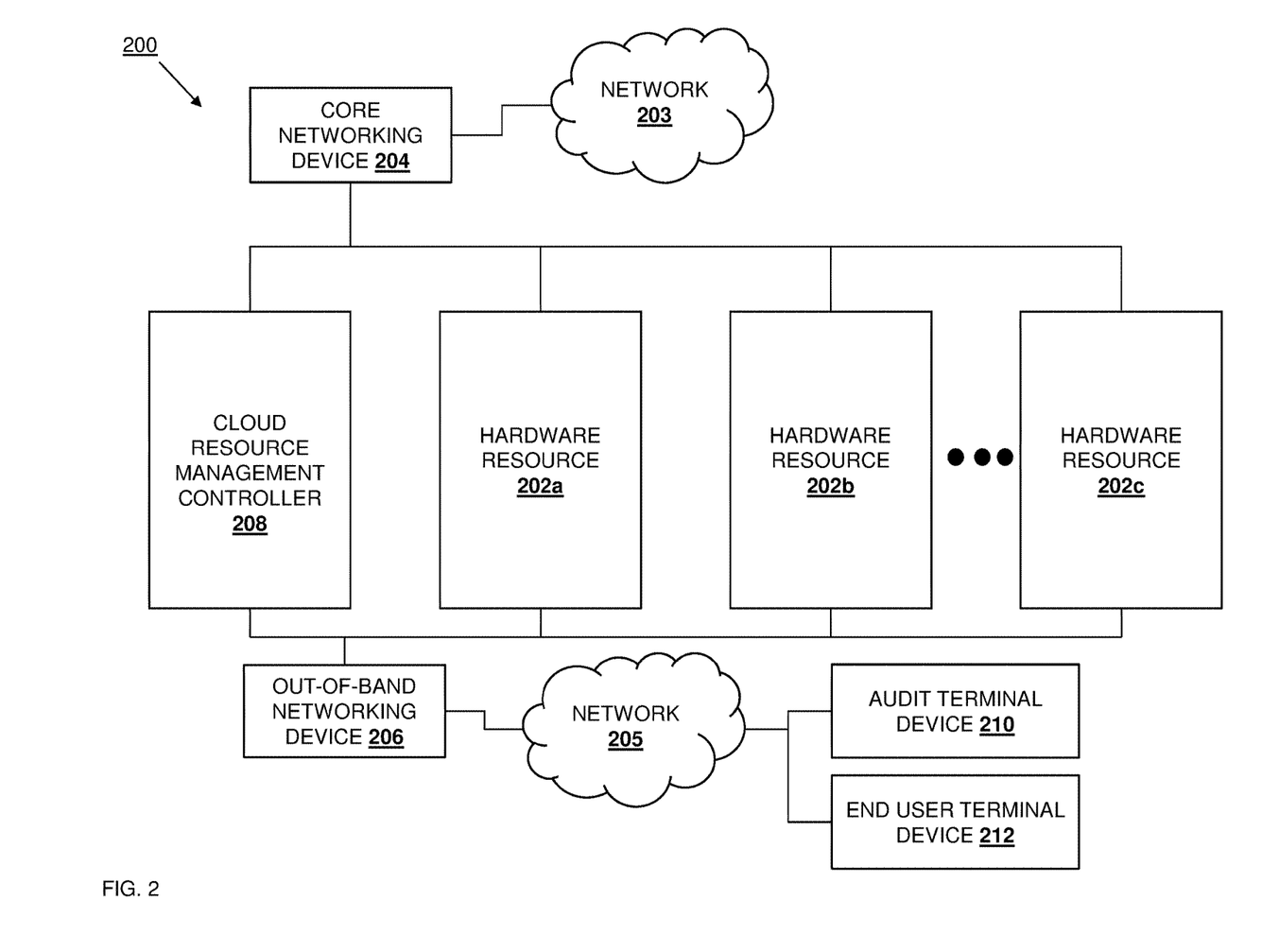
FIG. 2 is a schematic view illustrating an embodiment of a cloud resource audit system.

Referring now to FIG. 2, an embodiment of a cloud resource audit system 200 is illustrated. In the illustrated embodiment, the cloud resource audit system 200 includes a plurality of hardware resources 202a, 202b, and up to 202c. As will be appreciated by one of skill in the art in possession of the present disclosure, the hardware resources 202a, 202b, and up to 202c may be used to provide Bare-Metal as a Service (BMaaS) resources (also referred to as Bare-Metal Cloud (BMC) resources herein) as part of a BMaaS service, similarly as discussed above. As such, the hardware resources 202a, 202b, and up to 202c may each include one or more hardware components or one or more hardware and software components that may be allocated to a user. As such, in an embodiment, each of the hardware resources 202a, 202b, and up to 202c may be provided by the IHS 100 discussed above with reference to FIG. 1, and/or may include some or all of the components of the IHS 100. In some embodiments, the hardware resources 202a, 202b, and up to 202c may be located in a datacenter that is owned and maintained by an infrastructure owner. However, one of skill in the art in possession of the present disclosure will recognize that the hardware resources 202a, 202b, and up to 202c may be distributed among various datacenters or various locations while remaining within the scope of the present disclosure as well.

As illustrated, the hardware resources 202a, 202b, and up to 202c may each be coupled to a network 203 (e.g., an in-band network) via a core networking device 204. In an embodiment, the core networking device 204 may be provided by the IHS 100 discussed above with reference to FIG. 1, and/or may include some or all of the components of the IHS 100. For example, the core networking device 204 may include a switch device, a router device, and/or any other networking device that would be apparent to one of skill in the art. Furthermore, the network 203 may be provided by a Local Area Network (LAN), the Internet, combinations thereof, and/or any other networks that would be apparent to one of skill in the art in possession of the present disclosure. Further still, the hardware resources 202a, 202b, and up to 202c may each be coupled to a network 205 (e.g., an out-of-band network) via an out-of-band networking device 206. In an embodiment, the out-of-band networking device 206 may be provided by the IHS 100 discussed above with reference to FIG. 1, and/or may include some or all of the components of the IHS 100. For example, the out-of-band networking device 206 may include a switch device, a router device, and/or any other device that would be apparent to one of skill in the art in possession of the present disclosure.

In the illustrated embodiment, the cloud resource audit system 200 also includes a cloud resource management controller 208. In some embodiments, the cloud resource management controller 208 may be provided by the IHS 100 discussed above with reference to FIG. 1, and/or may include some or all of the components of the IHS 100. In specific examples, the cloud resource management controller 208 may be provided by one or more server devices, although other cloud resource management controllers will fall within the scope of the present disclosure as well. In some examples, the cloud resource management controller 208 may be provided by one or more of the hardware resources 202a, 202b, and up to 202c that may also be allocated to a user based on a Service Level Agreement between the user device and the infrastructure owner. As illustrated, the cloud resource management controller 208 may be coupled to the hardware resources 202a, 202b, and up to 202 via the core networking device 204 and/or the out-of-band networking device 206.

In an embodiment, the cloud resource management controller 208 may be coupled to an audit terminal device 210 and to an end user terminal device 212 via the network 205. In an embodiment, either or both of the audit terminal device 210 and the end user terminal device 212 may be provided by the IHS 100 discussed above with reference to FIG. 1, and/or may include some or all of the components of the IHS 100. For example, the audit terminal device 210 may be a server device or other computing device through which an auditor can access the cloud resource management controller 208. In an embodiment the auditor may be, in fact, a program or a remote system. In that case, the cloud resource management controller 208 may be accessed programmatically (i.e. using mechanisms such as API, CLI, or UI invocations). The use of the terminal 210 is then merely as a conduit mechanism for the API, CLI, or UI invocations. This should be obvious to someone skilled in the art. Similarly, the end user terminal device 212 may be a server device or other computing device through which the user may access the cloud resource management controller 208. While not illustrated, one of skill in the art in possession of the present disclosure will recognize that the audit terminal device 210 and the end user terminal device 212 may be coupled to the network 203 as well as the network 205. However, while specific examples of a cloud resource audit system 200 have been illustrated and described, one of skill in the art in possession of the present disclosure will recognize that the cloud resource audit system of the present disclosure may include a variety of components and component configurations while remaining within the scope of the present disclosure as well.

Figure 3:
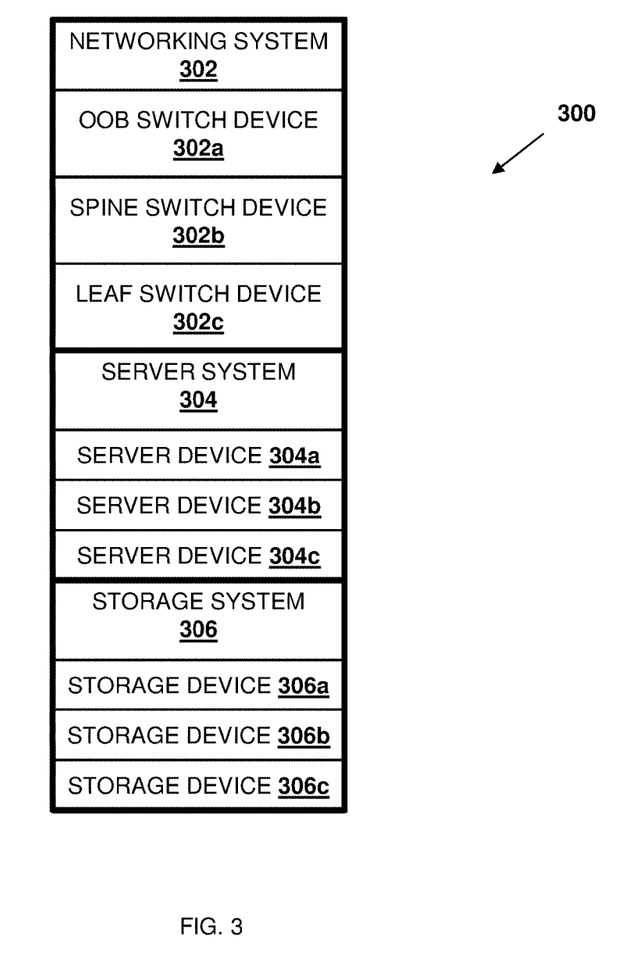
FIG. 3 is a schematic view illustrating an embodiment of a hardware resource that may be provided in the cloud resource audit system of FIG. 2.

Referring now to FIG. 3, an embodiment of a hardware resource 300 is illustrated that may provide any or all of the hardware resources 202a, 202b, and/or 202c discussed above with reference to FIG. 2. Furthermore, in some embodiments, hardware resource 300 may provide the cloud resource management controller 208 discussed above with reference to FIG. 2 as well. As such, the hardware resource 300 may be provided by the IHS 100 discussed above with reference to FIG. 1 and/or may include some or all of the components of the IHS 100. In an embodiment, the hardware resource 300 may include a networking system 302, a server system 304, and/or a storage system 306. As illustrated, the networking system 302 may include an out-of-band switch device 302a that may be coupled to and in communication with the network 205, a spine switch device 302b that may be coupled to and in communication with the network 203, and/or a leaf switch device 302c. In some embodiments, the out-of-band switch device 302a that may be coupled to and in communication with the network 205 may be organized as a leaf/spine switch architecture as well. Furthermore, the server system 304 may include one or more server devices 304a, 304b, and/or up to 304c. Further still, the storage system 306 may include one or more storage devices 306a, 306b, and/or up to 306c, and or all of which may include one or more disk drives, solid-state drives, and/or other storage devices or storage arrays that would be apparent to one of skill in the art in possession of the present disclosure.

As would be appreciated by one of skill in the art, the networking system 302, the server system 304, and/or the storage system 306 may be provided in a rack chassis and, in some embodiments, each of the hardware resource 202a-202c discussed above with reference to FIG. 2 may be provided by a distinct rack chassis. Furthermore, one of skill in the art in possession of the present disclosure will recognize that the various networking devices 302a-302c included in the networking system 302, the server devices 304a-304c included in the server system 304, and/or the storage devices 306a-306c included in the storage system 306, may each include one or more hardware components and/or hardware subsystems (e.g., NICs, BIOs, Redundant Array of Independent Disks (RAID), server utilization, network traffic filtering and tracing, user identities, physical chassis tampering, Light Emitting Diode (LED) status, storage device operations at the lowest (generally block) level, hardware state changes from known-good states, memory block read/writes, processor power states & consumption, etc.) that are configurable, as well as including one or more software components (e.g., an Operating System (OS), firmware change tracking, baseboard management controller (e.g. iDRAC) intrusion attempts, copy operations on SED (self-encrypting drive) devices) that are configurable to operate and interconnect the hardware resources 300. However, while specific examples of a hardware resource 300 have been illustrated and described, one of skill in the art in possession of the present disclosure will recognize that the hardware resources of the present disclosure may include a variety of components and component configurations while remaining within the scope of the present disclosure as well.

Figure 4:
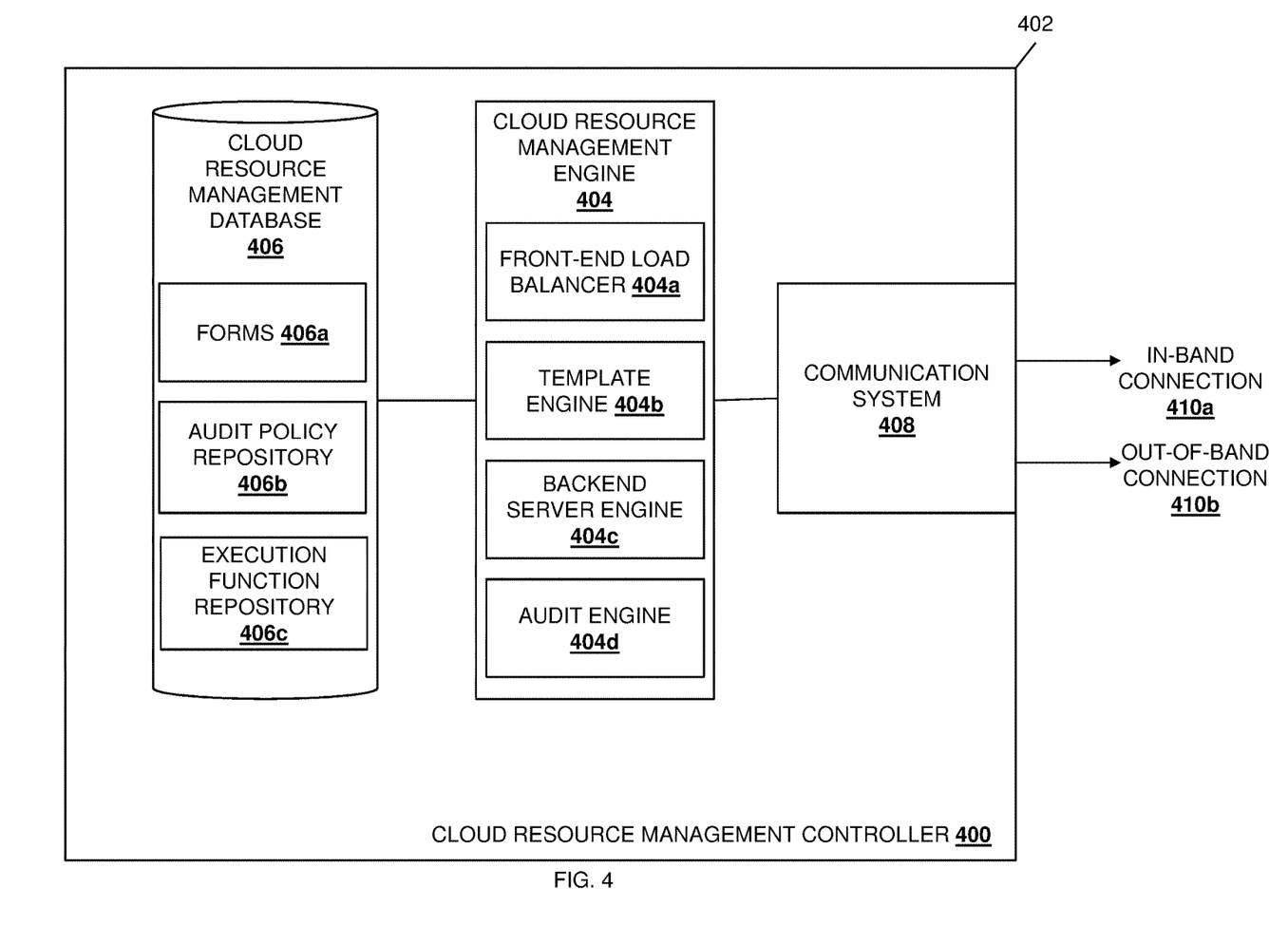
FIG. 4 is a schematic view illustrating an embodiment of a cloud resource management controller that may be provided in the cloud resource audit system of FIG. 2.

Referring now to FIG. 4, an embodiment of a cloud resource management controller 400, which may be cloud resource management controller 208 of FIG. 2, is illustrated. In an embodiment, the cloud resource management controller 400 may be provided by the IHS 100 discussed above with reference to FIG. 1, and/or may include some or all of the components of the IHS 100. As discussed above, the cloud resource management controller 400 may be provided by one or more server devices, desktop computing devices, laptop/notebook computing devices, tablet computing devices, mobile phones, the hardware resource 300 discussed above (e.g., that includes a networking system 302, server system 304, and/or a storage system 306), and/or other computing devices that would be apparent to one of skill in the art in possession of the present disclosure. In the illustrated embodiment, the cloud resource management controller 400 includes a chassis 402 that houses the components of the cloud resource management system 400, only some of which are illustrated in FIG. 4.

For example, the chassis 402 may house a processing system (not illustrated, but which may include the processor 102 discussed above with reference to FIG. 1) and a memory system (not illustrated, but which may include the memory system discussed above with reference to FIG. 1) that include instructions that, when executed by the processing system, cause the processing system to provide a cloud resource management engine 404 that is configured to perform the functions of the cloud resource management engines and cloud resource management controllers discussed below. Furthermore, the chassis 402 may also house a storage device (not illustrated, but which may be the storage device 108 discussed above with reference to FIG. 1) that is coupled to the cloud resource management engine 404 (e.g., via a coupling between the storage device and the processing system) and that includes a cloud resource management database 406 that is configured to store the rules and/or other data utilized by the cloud resource management engine 404 in order to provide the functionality discussed below. For example, the cloud resource management database 406 may include forms 406a, an audit policy repository 406b, and an execution function repository 406c, discussed in further detail below.

In various embodiments, the cloud resource management engine 404 may include a frontend load balancer 404a that is configured to perform the functions of the frontend load balancers and cloud resource management controllers discussed below, a template engine 404b that is configured to perform the functions of the template engines and cloud resource management controllers discussed below, and a backend server engine 404c that is configured to perform the functions of the backend server engines and cloud resource management controllers discussed below. In some embodiments, the frontend load balancer 404a may be provided by a front-end server device or as a service. In a specific example, the frontend load balancer 404a may be configured to receive user requests (e.g., a request for a web page) and determine where to forward the user request, and may include algorithms that are configured to identify available backend servers/services that provide the backend server engine 404c. Furthermore, in some examples, the frontend load balancer 404a may use one or more of the forms 406a stored in a cloud resource management database 406 in order to provide a HyperText Markup Language (HTML) web page that allows a user to enter data that is sent to the backend server engine 404c for processing.

In some embodiments, the backend server engine 404c may be configured to process user requests from the frontend load balancer 404a provided in the HTML web page, and may include logic that allows it to respond to various user requests based on, for example, a HyperText Transfer Protocol (HTTP) verb and a Uniform Resource Identifier (URI) called route. As will be appreciated by one of skill in the art in possession of the present disclosure, the backend server engine 404c may be used to provide management communications with the hardware resources 202a-202c, and may include one or more management services that may operate to manage one or more of the hardware resources 202a-202c or systems included in the hardware resources 202a-202c. For example, the management services may include a DELL® OpenManage Enterprise (OME) available from DELL® Inc. of Round Rock, Tex., United States, DELL® Open Manage Ansible Module (OMAM) available from DELL® Inc., SmartFabric Services (SFS) available from DELL® Inc., an Ansible Framework, and/or any other software resource and/or hardware resource management, provisioning, and/or deployment application that would be apparent to one of skill in the art in possession of the present disclosure. As illustrated, the cloud resource management engine 404 may also include the template engine 404b that may be configured to replace variables in static HTML template files with actual values received in responses from the backend server engine 404c, and send the HTML template file to a user via the frontend load balancer 404a.

In various embodiments, the cloud resource management engine 404 may include an audit engine 404d that is configured to perform the functions of the audit engines and cloud resource management controllers discussed below. For example, the audit engine 404d may be configured to use one or more audit policies stored in the audit policy repository 406b in the cloud resource management database 406 when executing one or more audit execution functions stored in the execution function repository 406c in the cloud resource management database 406 in order to provide the auditing functionality discussed below.

The chassis 402 may also house a communication system 408 that is coupled to the cloud resource management engine 404 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As can be seen in the illustrated example, the communication system 408 may provide either or both of an in-band connection 410a and an out-of-band connection 410b to, for example, the out-of-band networking device 206 discussed above with reference to FIG. 2, the core networking device 204 discussed above with reference to FIG. 2, the hardware resource 202a-202c devices discussed above with reference to FIG. 2, and/or any other device that would be apparent to one of skill in the art in possession of the present disclosure. However, while a specific cloud resource management controller 400 has been illustrated and described, one of skill in the art in possession of the present disclosure will recognize that cloud resource management controllers (or other devices operating according to the teachings of the present disclosure in a manner similar to that described below for the cloud resource management controller 400) may include a variety of components and/or component configurations for providing conventional service functionality (e.g., BMaaS functionality), as well as the functionality discussed below, while remaining within the scope of the present disclosure as well.

Figure 5:
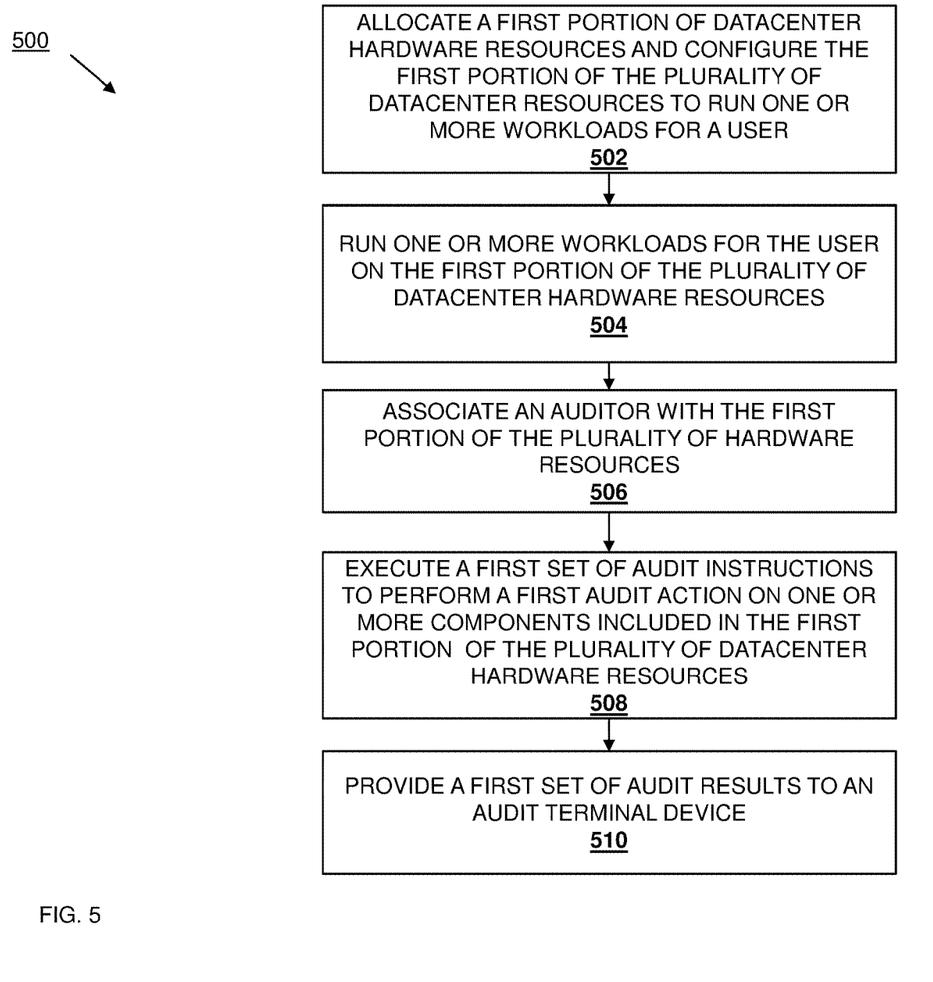
FIG. 5 is a flow chart illustrating an embodiment of auditing resources allocated to an end user.

Referring now to FIG. 5, an embodiment of a method for performing audits on hardware resources is illustrated. As discussed below, the systems and method of the present disclosure provide a cloud resource management controller (e.g., a BMaaS/BMC controller) that includes audit functionality for hardware resources provided in a datacenter in a manner that reduces the complexity of audits, that obscures and audit from an user of the resources, that provides audit specific policies and functions known only to the auditor, and that can operate when a workload of the user is operating on allocated resources. For example, a user of allocated BMaaS/BMC resources in a BMaaS/BMC infrastructure may utilize a cloud resource management controller to manage, provision, and/or deploy hardware resources and workloads on the allocated BMaaS/BMC resources, and that cloud resource management controller may include an audit engine that is only accessible to an auditor via auditor permissions and credentials. As such, the user of the BMaaS/BMC infrastructure may give permission to an auditor to audit the allocated BMaaS/BMC resources, and the audit engine may provide a mechanism that allows the auditor to configure customized audit policies and customized audit execution functions. Based on audit condition(s) included in audit polic(ies), the audit engine may use one or more audit policies and one or more execution functions to perform an audit action in order to generate an audit response, and the audit engine may retrieve and provide the audit response to the auditor via an audit terminal device. As such, more reliable and customizable audits may be performed that allow all hardware components and/or software components that are included in the allocated BMaaS/BMC resources and accessible via an out-of-band connection to be audited.

The method 500 begins at block 502 where a cloud resource management controller allocates a first portion of a plurality of datacenter hardware resources and configures the first portion of the plurality of datacenter hardware resources to run one or more workloads for a user. In an embodiment, at block 502, the cloud resource management engine 404 in the cloud resource management controller 208/400 may allocate a first portion of the hardware resources 202a, 202b, and/or up to 202c to run one or more workloads for a user on the first portion of the hardware resources 202a, 202b, and/or up to 202c. For example, the hardware resource 202a may be allocated to the user based on an agreement between the user and the infrastructure owner of the hardware resources 202a, 202b, and/or up to 202c. In an embodiment, the first portion of the hardware resource may include the networking system 302, the server system 304, and/or the storage system 306 included in the hardware resource 202a/300 and, in different embodiments, the first portion of the hardware resource may include any sub-portion or subcomponents of those systems 302, 304, and/or 306 (e.g., the server device 304a but not the server device 304c). In a specific embodiment, the infrastructure owner may provide, via the cloud resource management engine 404 in the cloud resource management controller 208/400, Role-Based Access Control (RBAC) to the user such that the user has certain permissions to access and use the hardware resources, as well as to access features provided by the cloud resource management engine 404 in the cloud resource management controller 208/400. For example, the user may have permissions to utilize the forms 406a, the frontend load balancer 404a, the template engine 404b, the backend server engine 404c, and/or portions thereof, but may not be provided any permissions to utilize the audit engine 404d.

The method 500 then proceeds to block 504 where the first portion of the plurality of datacenter hardware resources runs one or more workloads for the user. In an embodiment, at block 504, the cloud resource management engine 404 in the cloud resource management controller 208/400 may configure the hardware resource 202a according to user preference(s), which one of skill in the art in possession of the present disclosure will recognize may cause workloads to be run on the hardware resources 202a. For example, the user may manage, configure, provision, and/or deploy hardware and/or software resources included in the hardware resources 202a in order to perform a workload. In specific examples, the user may manage, via the end user terminal device 212 and the cloud resource management engine 404 in the cloud resource management controller 208/400, Redundant Array of Independent Disks (RAID) configurations, Network Interface Controller (NIC) configurations, Basic Input/Output System (BIOS) settings, Virtual Local Area Network (VLAN) configurations, jumbo frames configurations, Logical Unit Number (LUN) configurations, software resources such as an operating system, and/or other datacenter infrastructure hardware and software components that would be apparent to one of skill in the art in possession of the present disclosure. As would be understood by one of skill in the art in possession of the present disclosure, a workload being run on the hardware resource 202a may provide a service via the network 203 for the user.

The method 500 then proceeds to block 506 where the cloud resource management system associates an auditor with the first portion of the plurality of hardware resources. In an embodiment, at block 506, the cloud resource management engine 404 in the cloud resource management controller 208/400 may receive a request from the audit terminal device 210 for audit rights to the portion of the hardware resources 202a-202c allocated to the user. In various embodiments, the request received at block 506 may include an auditor identifier (e.g., a token, a key, a string, etc.) that may be unique to the particular auditor, and that may be provided to the auditor by the infrastructure owner. Furthermore, the request may also include a user identifier (e.g., a token, a key, a string, etc.) that may be provided to the auditor by the user, and that may be unique to the user. As will be appreciated by one of skill in the art in possession of the present disclosure, the combination of the auditor identifier and the user identifier may be used to authorize the auditor to access the hardware resources allocated to the user, and RBAC may operate to grant the audit permissions to the auditor. As such, the auditor may be granted permissions to access the audit engine 404d for the portion of the hardware resources 202a-202c allocated to the user. In some embodiments, the auditor may also be granted permission to access one or more modules available to the user via the cloud resource management engine 404 in the cloud resource management controller 208/400 such as the forms 406a, the frontend load balancer 404a, the template engine 404b, the backend server engine 404c, and/or any other data or functions that are accessible to the end user (e.g., via the cloud resource management engine 404 in the cloud resource management controller 208/400). However, as will be appreciated by one of skill in the art in possession of the present disclosure, at least some data and functions available to the user may not be available to the auditor.

In some embodiments, the auditor may be granted access to the audit policy repository 406b and the execution function repository 406c included in the cloud resource management controller 208/400, each of which is not accessible to the user and, in some cases, the infrastructure owner. For example, the audit policy repository 406b may store one or more audit policies that may include configuration files that define the behavior of the audit engine 404d, and the audit policies stored in the audit policy repository 406b may include default audit policies and/or customizable audit polices and may be updated, configured, removed, and/or added by the auditor via the audit terminal device 210. In specific examples, the audit policies may include policies such as (1) when a sequence of packet appears on a NIC port, take a snapshot of a portion of a storage device, (2) when a firmware update instruction violates version limitations, send an alert, (3) when the encryption key store for self-encrypting storage devices is accessed, log the accesses, (4) if the number of servers rented by the user reaches a threshold, send an alert, (5) sample disk blocks at pre-set time intervals and counts, check for personal or private information that matches formats such as social security numbers, and/or any other audit policies that would be apparent to one of skill in the art in possession of the present disclosure.

In an embodiment, the execution function repository 406c may include one or more execution functions, and each audit policy in the audit policy repository 406b discussed above may be associated with an execution function that includes audit instructions. For example, the audit instructions may provide the logic for the audit policy that is associated with the execution function that includes those audit instructions, and the audit instructions stored in the execution function repository 406c may include default audit instructions and/or customizable audit instructions and may be updated, configured, removed, and/or added by the auditor via the audit terminal device 210. In specific examples, the audit instructions may include instructions such as (1) read the passwords or authentication tokens stored in the server, storage, network equipment databases and check that they are not plaintext, (2) when a new storage device is added read blocks randomly, under a random-number generation regime that's hidden within the code of the function, (3) when a NIC port is configured for smart NIC functions such as SR-IOV or software-defined networking, download and sample the routing/switching database to check that no unauthorized routes are included (e.g. packet copies) and/or any other audit instructions that would be apparent to one of skill in the art in possession of the present disclosure.

The method 500 then proceeds to block 508 where the cloud resource management system executes a first set of audit instructions to perform a first audit action on one or more datacenter hardware resources included in the first portion of the plurality of datacenter hardware resources. In an embodiment, at block 506, the audit engine 404*d* in the cloud resource management controller 208/400 may execute a first set of audit instructions to perform a first audit action on one or more of the hardware resources 202*a* that are allocated to the end user. For example, the audit engine 404*d* may monitor for an audit condition included in a first audit policy that is associated with the first set of audit instructions by, for example, monitoring for an audit request from an auditor via the audit terminal device 210 that includes instructions to perform one of the audit polices and the associated audit instructions for that audit policy. In other embodiments, the audit engine 404*d* may monitor for other conditions that are internal and/or external to the cloud resource audit system 200 such as, for example, monitoring based on the audit policies stored in the audit policy repository 406*b* for a time, a time interval, a particular workload being run on the hardware resources 202*a*, a lack of workloads being run on the hardware resource 202*a*, a load condition on the hardware resource 202*a*, a particular command issued via the cloud resource management controller 208/400 by the end user, and/or any other audit condition or event that would be apparent to one of skill in the art in possession of the present disclosure. For example, if the infrastructure owner determines that the cloud resource audit system 200 was hacked, and user resources may have been exposed, an auditor may initiate bare-metal audit functions via the audit engine 404*d* to determine if low-level firmware changes, configuration changes, capacity changes were effected by hacker actions, and recommend an perform remediation. In another example, when national critical infrastructure is under attack, a government may order such an audit, or conduct such an audit themselves via the audit engine 404*d* outside the control of the infrastructure owner and the user.

In response to the audit condition being satisfied in the first audit policy, the audit engine 404*d* in the cloud resource management controller 208/400 may retrieve any audit parameters for the first audit policy from the audit policy repository 406*b*, and may retrieve the execution function that includes the first audit instructions associated with the first audit policy from the execution function repository 406*c*. The audit engine 404*d* in the cloud resource management controller 208/400 may then execute the first audit instructions using the audit parameters in the first audit policy in order to perform the first audit action on the hardware resources 202*a*. Furthermore, the audit engine 404*d* in the cloud resource management controller 208/400 may access any of the sub-engines that are included in the cloud resource management engine 404 and that are used by the user to manage the various hardware and software components included in the hardware resources 202*a* in order to perform the audit action. In several embodiments, the audit engine 404*d* may perform the audit action by accessing the hardware resource 202*a* via the out-of-band connection 410*b*. As will be appreciated by one of skill in the art in possession of the present disclosure, when the cloud resource management engine 404 includes the audit engine 404*d* and the auditor is given permission to access and use the audit engine 404*d*, the auditor may perform audits on the hardware resource 202*a* without the user knowing when the audit is being performed, and what audit is being performed, thus obscuring the first audit action from the user.

In various embodiments, the audit engine 404*d* in the cloud resource management controller 208/400 may, in response to the executing the first set of audit instructions to perform the first audit action, deallocate a first sub-portion of the first portion of the hardware resources 202*a*-202*c* from running the one or more workloads, and may allocate that first sub-portion of the first portion of the hardware resources 202*a*-202*c* to performing the first audit action. For example, the audit engine 404*d* in the cloud resource management controller 208/400 may deallocate a portion of the hardware resource 202*a* that is allocated to the user, and then utilized that portion of the hardware resource 202*a* to perform the audit action. In some examples, the reallocated portion of the hardware resource 202*a* may be defined in the audit policy retrieved from the audit policy repository 406*b* and/or the execution function retrieved from the execution function repository 406*c*. Furthermore, when the first audit action has completed, the audit engine 404*d* may then reallocate the first sub-portion of the hardware resource 202*a*-202*c* back to the one or more workloads and the resource pool allocated to the user. In various embodiments, the audit engine 404*d* itself may have its own dedicated hardware resources and may be dedicated within the cloud resource management controller 400 and not under control of the user. The primary reason for this is that the audit capability itself is offered as a service and should be unbeknownst to the user.

The method then proceeds to block 510 where the cloud resource management controller provides a first set of audit results to the audit terminal device. In an embodiment, at block 510, the audit engine 404*d* in the cloud resource management controller 208/400 may receive audit results in response to the audit action being performed on the hardware resources 202*a*. In several embodiments, the audit results may be obtained over the out-of-band connection 410*b*. Upon receiving the audit results, the audit engine 404*d* may store the audit results in the cloud resources management database 406 for retrieval by the auditor at later time, or may provide the audit results to the audit terminal device 210 (e.g., via a graphical user interface provided on a display device coupled to the audit terminal device 210 or via any other output device that would be apparent to one of skill in the art in possession of the present disclosure).

In a specific example of the method 500, the user may have permissions and the ability to write data (e.g., a byte of data) repeatedly to storage device locations included in the storage system 306 (as per the user's preferences) such that the end user has the ability to write when, where and duration, and similar permission may be given to the end user to perform various user actions with other components such as, for example, NICs and/or other hardware and software components included in the hardware resource 202*a*. Furthermore, the cloud resource management controller 208/400 may store and execute auditor defined policies and auditor defined actions via the audit engine 404*d*, and audit actions may include auditing of the storage device 306*a* included in the storage system 306 of the hardware resource 202*a* after the end user has performed a security action such as the writing of data over the storage device 306*a*. Furthermore, those audit actions may include zeroing out the storage device where each bit present in the storage device 306*a* is replaced by a zero value to determine if the user's security actions worked, and the audit engine 404*d* in the cloud resource management controller 208/400 may segregate the storage device 306*a* from the other hardware and/or software components allocated to the user and may give the control of the storage device 306*a* to the auditor/audit engine 404*d* to determine which bytes stored in the storage device 306*a* will have its bits replaced with a zero value (and when those bytes will be tested). One of skill in the art will appreciate that the system components may be reallocated to the user when the auditor has completed the audit on those system components included in the hardware resources. As such, low level components included in the hardware resources may be controlled by an auditor so that audit actions may be performed on these low-level components by themselves.

Thus, systems and methods have been described that provide a cloud resource audit system with audit functionality for an auditor to perform audit functions on one or more hardware resources in a datacenter that are allocated to an end user as a service (e.g., a BMaaS/BMC service). An audit engine that is included in a cloud resource management controller and used by a user to perform management functionality (e.g., configuration of resources, provisioning of resources, etc.) with the resources allocated to the end user may be made available to an auditor via audit permissions that provide the auditor with access to an audit engine in the cloud resource management controller that is inaccessible to the user (who lacks those audit permissions). As such, audit actions performed by the auditor may be obscured from the user such that the user cannot easily detect that an audit action is being performed. Furthermore, the cloud resources audit system may be configured and managed by the auditor such that the auditor can perform customizable and/or automated audits on one or more of the resources allocated to the end user.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cloud resource audit system, comprising:
a plurality of hardware resources provided by an infrastructure owner; and
a cloud resource management controller that is coupled to the plurality of hardware resources and that is configured to:
allocate hardware resources to a user;
provide hardware resource permissions to the user that enable the user to access and use the hardware resources without enabling the user to access or use an audit engine for the hardware resources that is included in the cloud resource management controller, an audit policy repository that is included in the cloud resource management controller and that stores audit policies for use by the audit engine, and an execution function repository that is included in the cloud resource management controller and that includes respective execution functions having sets of audit instructions for each audit policy;
run one or more workloads for the user on the hardware resources based on the hardware resource access/usage permissions;
receive, via an audit terminal device from an auditor that is different from the infrastructure owner and the user, a request to audit the hardware resources;
determine that the request includes an auditor identifier that is unique to the auditor and that was issued by the infrastructure owner, and a user identifier that is unique to the user and that was provided by the user to the auditor;
provide, in response to determining that the request includes the auditor identifier and the user identifier, audit permissions that enable the auditor to access and use the audit engine, the audit policy repository, and the execution function repository;
receive, via the audit terminal device, a first communication from the auditor that is directed to the audit policy repository, and that identifies a first set of audit instructions;
execute, using the audit engine, the first set of audit instructions to perform a first audit action on the hardware resources to generate a first set of audit results; and
provide the first set of audit results to the audit terminal device.

2. The system of claim 1, wherein the hardware resource permissions provided to the user enable the user to access at least some data that is not accessible via the audit permissions provided to the auditor.

3. The system of claim 1, wherein the cloud resource management controller is configured to:
execute the first set of audit instructions to perform the first audit action on the hardware resources to generate the first set of audit results during the running of the one or more workloads on the hardware resources.

4. The system of claim 1, wherein the cloud resource management controller is configured to:
receive, via the audit terminal device, a second communication from the auditor that is directed to the audit policy repository and that identifies a second set of audit instructions; and
store the second set of audit instructions as an execution function in the execution function repository.

5. The system of claim 1, wherein the cloud resource management controller is configured to:
receive, via the audit terminal device in response to a second communication from the auditor, an audit instruction update for the first set of audit instructions; and
update, using the audit instruction update, the first set of audit instructions in an execution function in the execution function repository to provide an updated first set of audit instructions in the execution function in the execution function repository.

6. The system of claim 1, wherein the cloud resource management controller is configured to:
monitor for a condition included in an audit policy that is associated with the first set of audit instructions, wherein the first set of audit instructions are executed in response to the first condition being satisfied.

7. The system of claim 1, wherein the cloud resource management controller is configured to:
deallocate, as part of the execution of the first set of audit instructions to perform the first audit action, a portion of the hardware resources from running the one or more workloads;
allocate the portion of the hardware resources to performing the first audit action; and
reallocate, subsequent to performing the first audit action, the first portion of the hardware resources back to the one or more workloads.

8. An Information Handling System (IHS), comprising:
a processing system; and
a memory system coupled to the processing system and that includes instructions that, when executed by the processing system, cause the processing system to provide a cloud resource management engine that is configured to:
  allocate, to a user, hardware resources provided by an infrastructure owner;
  provide hardware resource permissions to the user that enable the user to access and use the hardware resources without enabling the user to access or use an audit engine for the hardware resources that is included in the cloud resource management engine, an audit policy repository that is accessible to the cloud resource management engine and that stores audit policies for use by the audit engine, and an execution function repository that is accessible by the cloud resource management engine and that includes respective execution functions having sets of audit instructions for each audit policy;
  run one or more workloads for the user on the hardware resources based on the hardware resource access/usage permissions;
  receive, via an audit terminal device from an auditor that is different from the infrastructure owner and the user, a request to audit the hardware resources;
  determine that the request includes an auditor identifier that is unique to the auditor and that was issued by the infrastructure owner, and a user identifier that is unique to the user and that was provided by the user to the auditor;
  provide, in response to determining that the request includes the auditor identifier and the user identifier, audit permissions that enable the auditor to access and use the audit engine, the audit policy repository, and the execution function repository;
  receive, via the audit terminal device, a first communication from the auditor that is directed to the audit policy repository and that identifies a first set of audit instructions;
  execute, using the audit engine, the first set of audit instructions to perform a first audit action on the hardware resources to generate a first set of audit results; and
  provide the first set of audit results to the audit terminal device.

9. The IHS of claim 8, wherein the hardware resource permissions provided to the user
  enable the user to access at least some data that is not accessible via the audit permissions provided to the auditor.

10. The IHS of claim 8, wherein the cloud resource management engine is further configured to:
  execute the first set of audit instructions to perform the first audit action on the hardware resources to generate the first set of audit results during the running of the one or more workloads on the hardware resources.

11. The IHS of claim 8, wherein the cloud resource management engine is further configured to:
  receive, via the audit terminal device, a second communication from the auditor that is directed to the audit policy repository and that identifies a second set of audit instructions; and
  store the second set of audit instructions as an execution function in the execution function repository.

12. The IHS of claim 8, wherein the cloud resource management engine is further configured to:
  receive, via the audit terminal device in response to a second communication from the auditor, an audit instruction update for the first set of audit instructions; and
  update, using the audit instruction update, the first set of audit instructions in an execution function in the execution function repository to provide an updated first set of audit instructions in the execution function in the execution function repository.

13. The IHS of claim 8, wherein the cloud resource management engine is further configured to:
  monitor for a condition included in an audit policy that is associated with the first set of audit instructions, wherein the first set of audit instructions are executed in response to the first condition being satisfied.

14. The IHS of claim 8, wherein the cloud resource management engine is further configured to:
  deallocate, as part of the execution of the first set of audit instructions to perform the first audit action, a portion of the hardware resources from running the one or more workloads;
  allocate the portion of the hardware resources to performing the first audit action; and
  reallocate, subsequent to performing the first audit action, the first portion of the hardware resources back to the one or more workloads.

15. A method of auditing cloud resources, comprising:
  allocating, by a cloud resource management controller to a user, hardware resources provided by an infrastructure owner;
  providing, by the cloud resource management controller, hardware resource permissions to the user that enable the user to access and use the hardware resources without enabling the user to access or use an audit engine for the hardware resources that is included in the cloud resource management controller, an audit policy repository that is included in the cloud resource management controller and that stores audit policies for use by the audit engine, and an execution function repository that is included in the cloud resource management controller and that includes respective execution functions having sets of audit instructions for each audit policy;
  running, by the cloud resource management controller, one or more workloads for the user on the hardware resources based on the hardware resource access/usage permissions;
  receiving, by the cloud resource management controller via an audit terminal device from an auditor that is different from the infrastructure owner and the user, a request to audit the hardware resources;
  determining, by the cloud resource management controller, that the request includes an auditor identifier that is unique to the auditor and that was issued by the infrastructure owner, and a user identifier that is unique to the user and that was provided by the user to the auditor;
  provide, in response to determining that the request includes the auditor identifier and the user identifier, audit permissions that enable the auditor to access and use the audit engine for the hardware resources, the audit policy repository, and the execution function repository;
  receiving, by the cloud resource management controller via the audit terminal device, a first communication from the auditor that is directed to the audit policy repository and that identifies a first set of audit instructions;

executing, by the cloud resource management controller using the audit engine, the first set of audit instructions to perform a first audit action on the hardware resources to generate a first set of audit results; and providing, by the cloud resource management controller the first set of audit results to the audit terminal device.

16. The method of claim 15, wherein the hardware resource permissions provided to the user enable the user to access at least some data that is not accessible via the audit permissions provided to the auditor.

17. The method of claim 15, further comprising:

executing, by the cloud resource management controller, the first set of audit instructions to perform the first audit action on the hardware resources to generate the first set of audit results during the running of the one or more workloads on the hardware resources.

18. The method of claim 15, further comprising:

receiving, by the cloud resource management controller via the audit terminal device, a second communication from the auditor that is directed to the audit policy repository and that identifies a second set of audit instructions; and storing, by the cloud resource management controller, the second set of audit instructions as an execution function in the execution function repository.

19. The method of claim 15, further comprising:

monitoring, by the cloud resource management controller, for a condition included in an audit policy that is associated with the first set of audit instructions, wherein the first set of audit instructions are executed in response to the first condition being satisfied.

20. The method of claim 15, further comprising:

deallocating, by the cloud resource management controller as part of the execution of the first set of audit instructions to perform the first audit action, a portion of the hardware resources from running the one or more workloads;

allocating, by the cloud resource management controller, the portion of the hardware resources to performing the first audit action; and reallocating, by the cloud resource management controller subsequent to performing the first audit action, the first portion of the hardware resources back to the one or more workloads.

\* \* \* \* \*